(12) United States Patent
Athalye

(10) Patent No.: US 9,696,063 B2
(45) Date of Patent: Jul. 4, 2017

(54) COOLING SYSTEMS AND RELATED METHODS

(71) Applicant: Anish Athalye, Shrewsbury, MA (US)

(72) Inventor: Anish Athalye, Shrewsbury, MA (US)

(*) Notice: Subject to any disclaimer, the term of this patent is extended or adjusted under 35 U.S.C. 154(b) by 760 days.

(21) Appl. No.: 13/759,242

(22) Filed: Feb. 5, 2013

(65) Prior Publication Data

US 2013/0291574 A1 Nov. 7, 2013

Related U.S. Application Data

(60) Provisional application No. 61/642,467, filed on May 4, 2012.

(51) Int. Cl.
| | |
|---|---|
| *F25B 19/00* | (2006.01) |
| *F25B 15/00* | (2006.01) |
| *F25B 17/08* | (2006.01) |
| *F25B 17/04* | (2006.01) |
| *F25B 17/00* | (2006.01) |
| *F25B 27/00* | (2006.01) |

(52) U.S. Cl.
CPC .............. *F25B 15/00* (2013.01); *F25B 17/00* (2013.01); *F25B 17/04* (2013.01); *F25B 17/08* (2013.01); *F25B 17/086* (2013.01); *F25B 27/007* (2013.01); *Y02B 30/64* (2013.01)

(58) Field of Classification Search
CPC ........ F25B 17/08; F25B 17/086; F25B 17/00; F25B 17/04; F25B 27/007
USPC ........................... 62/483, 487, 488, 108, 111
See application file for complete search history.

(56) References Cited

U.S. PATENT DOCUMENTS

| 3,684,007 A * | 8/1972 | Ragi ...................... B21D 53/02 165/133 |
| 4,146,372 A * | 3/1979 | Groth ..................... B01D 53/26 95/124 |
| 4,489,777 A * | 12/1984 | Del Bagno .......... F28D 15/046 165/104.26 |
| 5,237,827 A | 8/1993 | Tchernev |
| 5,440,896 A * | 8/1995 | Maier-Laxhuber ... F25D 31/007 62/269 |
| 5,732,569 A * | 3/1998 | Sanada ................. F25B 17/083 62/148 |

(Continued)

FOREIGN PATENT DOCUMENTS

GB 515543 * 12/1939 .............. F25B 15/10

OTHER PUBLICATIONS

Balghouthi et al.; "Feasibility of solar absorption air conditioning in Tunisia"; 2008; ScienceDirect, Building and Environment; 43, pp. 1459-1470.

(Continued)

*Primary Examiner* — Orlando E Aviles Bosques
(74) *Attorney, Agent, or Firm* — Fish & Richardson P.C.

(57) ABSTRACT

Cooling systems using adsorption are described. The cooling systems use an adsorption cycle without continuous heat input and over a long duration. The cooling system can function by vaporizing a liquid at a reduced pressure. The cooling systems have applications in developing countries, in both arid and non-arid regions, allowing, for example, for the operation of refrigerators and small air conditioners without electrical input. The cooling systems can be used for cold storage. The cooling systems can present a greener alternative to conventional cooling methods in developed countries.

17 Claims, 12 Drawing Sheets

(56) References Cited

U.S. PATENT DOCUMENTS

| | | | |
|---|---|---|---|
| 6,154,478 A * | 11/2000 | Vetrovec | H01S 3/2215 372/34 |
| 6,294,090 B1 * | 9/2001 | Nussbaumer | B01D 61/00 210/143 |
| 6,513,339 B1 | 2/2003 | Kopko | |
| 2008/0209920 A1 * | 9/2008 | Mikheev | F25B 17/00 62/55.5 |

OTHER PUBLICATIONS

Desiccant Cooling. (n.d.). Retrieved Nov. 11, 2011, from http://www.daviddarling.info/encyclopedia/D/AD_desiccant_cooling.html.

Dieckmann et al.; "Radiant Ceiling Cooling"; 2004; ASHRAE, Emerging Technologies; pp. 42-43.

Evaporative Cooling. (n.d.). Retrieved Nov. 12, 2011, from http://smud.apogee.et/comsuite/content/ces/?utilid-smud&id-1069.

Halliday, et al.; "Is solar air conditioning feasible?"; 1999; Building Research & Information; 27; pp. 149-164.

Kabeel; "Solar powered air conditioning system using rotary honeycomb desiccant wheel"; 2007; ScienceDirect, Renewable Energy; 32, pp. 1842-1857.

Myers et al.; "Adsorption operations"; 2008; In AccessScience; retrieved from http://www.accessscience.com.ezproxy.wpi.edu/conent.aspx?id-280450.

Teller; "Gas absorption operations"; 2008; In AccessScience; retrieved from http://www.acessscience.com.exproxy.wpi.edu/content.aspx?id-280400.

Yellott;"Solar heating and cooling"; 2008; In AccessScience; retrieved from http://www.accessscience.com.ezproxy.wpi.edu/content.aspx?id-633400.

* cited by examiner

| ITS - 90 Temperature (°C) | Vapor Pressure of Water (Pa) |
|---|---|
| 0 | 611.2 |
| 2 | 706.0 |
| 4 | 813.5 |
| 6 | 935.3 |
| 8 | 1072.9 |
| 10 | 1228.1 |
| 12 | 1402.8 |
| 14 | 1598.9 |
| 16 | 1818.7 |
| 18 | 2064.7 |
| 20 | 2339.3 |
| 22 | 2645.3 |
| 24 | 2985.8 |
| 26 | 3363.9 |
| 28 | 3783.1 |
| 30 | 4247.0 |

FIG. 10

COOLING SYSTEMS AND RELATED METHODS

CROSS-REFERENCE TO RELATED APPLICATION

This application claims priority under 35 USC §119(e) to U.S. Provisional Patent Application Ser. No. 61/642,467, filed on May 4, 2012, the entire content of which is hereby incorporated by reference.

TECHNICAL FIELD

The present disclosure relates to cooling systems and related methods.

BACKGROUND

Currently, there are few, if any, inexpensive cooling systems that do not require continuously available energy input. For example, compression refrigeration systems require continuous electrical energy input, and ammonia absorption refrigeration systems require continuous heat input. Other systems that use alternative energy sources are immense in scale and unsuitable on a smaller scale and typically require suitable energy (e.g., electrical energy) for running pumps and other instrumentation.

Electrical energy is convenient but is becoming expensive and can have a large $CO_2$ footprint or problems associated with nuclear waste. Blackouts can also be a common occurrence worldwide, particularly in developing economies. Furthermore, it is desirable to reduce or eliminate ozone layer depleting emissions from conventional chlorofluorocarbon (CFC)-based vapor compression cooling equipment. Even in areas where electrical energy is readily available, it is desirable to increase the use of renewable energy such as solar energy.

Thus, it is desirable to have cooling devices working even when no electrical or conventional energy is available. For example, it is desirable to have a room cooling device working in cities of India even when there is no electrical supply available as happens so frequently due to load shedding or rolling blackouts. It is also desirable to decrease the use of conventional energy. The same is true in places like Arizona even though continuous supply of electricity may be available.

More than 30% of the energy consumed in the world is used for heating and/or cooling of buildings. Research on cooling systems generally focuses on one of two parts: (1) minimizing heat gains, or (2) optimizing cooling technologies, which can increase efficiency and lower energy costs without decreasing performance. Solar cooling can be an attractive alternative to fossil fuel powered cooling because the demand for cooling is usually greatest when there is an abundance of solar energy available.

SUMMARY

The present disclosure describes a cooling apparatus, such as a refrigerator or an air-conditioning unit that does not require continuous supply of conventional energy, either in the form of heat or electricity, to operate and produce a cooling effect. The cooling apparatus can operate using an adsorption cycle, where cooling is produced through the use of a solid adsorbent and a vapor. Heat removal (i.e., cooling) can occur through the evaporation of a vaporizable liquid and the removal of vapors through the adsorption of the vaporized liquid. Regeneration of the adsorbent (i.e., desorption), can be achieved by heating the adsorbent. The cooling apparatus improves upon the adsorption cycle and can be provided in various different sizes, including one that is sized for domestic application.

In one aspect, the disclosure features a cooling system including a cooling unit including a vaporizable liquid. The cooling unit is connected to an adsorbent unit including a solid adsorbent material to adsorb vapor generated in the cooling unit. The cooling system also includes a vacuum pump that can be placed in communication with the cooling unit, the adsorbent unit, or both the cooling unit and the adsorbent unit to generate negative pressure (e.g., an initial negative pressure, prior to vaporization of a vaporizable liquid in the cooling unit) within the cooling unit, the adsorbent unit, or both the cooling unit and the adsorbent unit.

In another aspect, the disclosure features a method including generating a negative pressure within a cooling system that includes a cooling unit connected to a first adsorbent unit, such that a vaporizable liquid in the cooling unit vaporizes and is adsorbed by an adsorbent material in the first adsorbent unit, thereby cooling the cooling unit.

Embodiments can include one or more of the following features.

In some embodiments, the cooling systems further include tubing connected (e.g., detachably connected) to the adsorbent unit. The tubing, the cooling unit, the vacuum pump, the adsorbent unit, or any combination of the tubing, the cooling unit, the vacuum pump, and the adsorbent unit can include matable fittings. In some embodiments, the cooling system further includes a fan operable to blow air over the cooling unit (e.g., to exchange heat energy with the surroundings).

In some embodiments, the adsorbent unit, the cooling unit, or both the adsorbent unit and cooling unit include a heat fin, a heat exchanger, a heat pin, a heat pipe, or any combination thereof. For example, the heat fin, heat exchanger, heat pin, and/or heat pipe can cool an adsorbent material during cooling of the cooling unit, can heat the adsorbent material during drying of the adsorbent material, and/or can conduct heat from an environment to the vaporizable fluid in the cooling unit. A part of the adsorbent unit (e.g., an adsorbent unit housing, or a part other than the adsorbent material) can include a non-corrosive thermally conductive material such as copper (e.g., oxygen-free copper), steel, stainless steel, aluminum, non-corrosive thermally conductive anodized metals, and/or alloys thereof.

In some embodiments, the adsorbent unit includes an adsorbent unit housing that contains the adsorbent material and a plurality of vapor-permeable spacers that separate portions of the adsorbent material from one another, configured such that the amount of adsorbent material exposed to a vapor can be maximized. In some embodiments, the adsorbent unit includes an adsorbent unit housing containing a plurality of vapor-permeable containers containing the solid adsorbent material, configured such that the amount of adsorbent material exposed to a vapor can be maximized. The solid adsorbent material can include a solid hygroscopic material such as silica gel, molecular sieves, natural and synthetic zeolites, an activated carbon, an alumina, a clay (e.g., montmorillonite), calcium sulfate, synthetic polymers, titanium silicate, and/or lithium chloride. The adsorbent unit can be rechargeable (i.e., reusable).

In some embodiments, the vaporizable liquid is water. The vaporizable fluid can be degassed prior to addition into the cooling system.

In some embodiments, the vacuum pump is manually operable. For example, the vacuum pump can include a hand-crank.

In some embodiments, a part of the cooling unit (e.g., a cooling unit housing or a part other than the vaporizable fluid) includes a non-corrosive thermally conductive material such as copper (e.g., oxygen-free copper), steel, stainless steel, aluminum, non-corrosive thermally conductive anodized metals, and/or alloys thereof. The cooling unit can further include cascading or stacked trays within the cooling unit housing. Multiple trays can increase the exposed surface area of the vaporizable liquid to increase evaporation rate. The trays can be in thermal contact with a surrounding environment external to the cooling unit. In some embodiments, the cooling unit includes (e.g., within one or more trays within the cooling unit) wicks, such as grooved, sintered, or mesh wicks to further increase evaporation rate of the vaporizable fluid. The cooling unit can include one or more of vaporization nucleation sites to increase evaporation rate of the vaporizable fluid (e.g., within a cooling tray, within a cooling unit housing). In some embodiments, the cooling unit includes a heat fin, a heat exchanger, a heat pin, a heat pipe, or any combination thereof, which can conduct heat from an environment to the vaporizable fluid in the cooling unit. The cooling unit can be disposed within an insulated container.

In some embodiments, negative pressure is generated in the cooling unit, the first adsorbent unit, or both the cooling and first adsorbent unit. In some embodiments, the method further includes disconnecting, drying, and replacing the first adsorbent unit, which can be partially saturated with adsorbed vapors, or fully saturated with adsorbed vapors. The vaporizable liquid in the cooling unit can vaporize and be adsorbed by an adsorbent material in a second adsorbent unit during the disconnecting, drying, or replacing of the first adsorbent unit.

In some embodiments, energy is input only once per cooling cycle (e.g., at generation of the negative pressure in the cooling and/or adsorbent units participating in the cooling cycle within the cooling system). Optionally, energy is intermittently input to maintain the negative pressure. The method can include adding a vaporizable liquid to the cooling unit after the negative pressure is generated in the cooling system. In some embodiments, the cooling unit can contain a vaporizable liquid before negative pressure is generated in the cooling system. Cooling of the cooling unit can be modulated (i.e., controlled) by controlling the amount of vaporized vaporizable fluid (e.g., relative to the amount of adsorbent material exposed to the vaporized fluid), the amount of adsorbent material (e.g., relative to the amount of vaporized vaporizable fluid present in the cooling system), or both the amount of vaporized vaporizable fluid and the amount of adsorbent material in the cooling system. Controlling the amount of vaporized vaporizable fluid and/or adsorbent material available to participate in cooling of the cooling unit can occur by shutting or opening valves between the cooling unit(s) and the adsorbent unit(s) in a cooling system. In some embodiments, a cooling system can be cooled to a given temperature by controlling the negative pressure in the cooling system.

Cooling of the cooling unit (by vaporizing a vaporizable fluid in the cooling unit and adsorbing the vaporized fluid using an adsorbent material in the adsorbent unit) and drying the adsorbent unit can occur at different times, locations, or both different times and locations. For example, after disconnecting an adsorbent unit (e.g., by shutting a connecting valve, or by physically removing the adsorbent unit) from a cooling system, drying of the adsorbent unit can occur at later time, at a physically separate location, or both at a later time (e.g., when an energy source such as solar energy is available) and a physically separate location (e.g., on a rooftop or in a field). In some embodiments, cooling of the cooling unit can continue by connecting a second adsorbent unit to the cooling system. Cooling of the cooling unit and drying of the first adsorbent unit can occur at different rates. For example, a cooling unit can be cooled for a number of hours, and a first adsorbent unit can be dried over a different number of hours.

Drying the adsorbent unit can include heating the adsorbent unit using an energy source such as solar energy, waste heat energy, electrical energy, and/or biogas heat energy. The system can have multiple sets of adsorbent units so that while some units are participating in the cooling, the other units can be regenerated (i.e., recharged, dried).

In some embodiments, generating a negative pressure includes manually generating the negative pressure. In certain embodiments, generating the negative pressure includes using an energy source such as electrical energy, wind energy, and solar energy.

Embodiments may have one or more of the following advantages.

The cooling system can cool without requiring a continuous supply of energy. Thus, it can be used in remote areas that do not have access to electricity or in areas that are prone to power outages. The cooling system can save lives by preserving food and/or medicine in such situations. The cooling system can also cool living areas in such situations and can improve living conditions and save lives of, for example, the elderly and the frail.

The cooling system does not require a continuous input of electricity to operate. In some embodiments, energy input is necessary only to place the cooling system under vacuum. The cooling system can be an open cycle cooling system, such that the cooling system can have a relatively simple design, thus allowing for optimization of individual components of the cooling system (e.g., a cooling unit, an adsorbent unit). The cooling system can use water as a refrigerant (i.e., vaporizable liquid), such that the refrigerant does not need to be recycled.

The cooling system can have low operating costs. The cooling apparatus can have low manufacturing cost and low maintenance requirement while maintaining high performance capacity, making the cooling device suitable for and improving living conditions of populations in underdeveloped or remote areas of the world.

The components of the cooling system (e.g., the adsorption component, the cooling component, the vacuum component) can be optimized individually. When the cooling system utilizes water as the vaporizable liquid, the cooling system can offer the advantages of high availability, low cost, non-toxicity, and reasonably high latent heat of vaporization for the vaporizable liquid.

The cooling system can be sized to cool both small volumes (e.g., a medicine refrigerator) and larger volumes (e.g., a large building). For example, it can have a small size for use in preservation of small amounts of medicine (e.g., emergency medication, vaccines, anti-venom, etc.) in rural areas. On a larger scale, the system can be used in cold storage facilities and rooftop installations.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 10 is a table showing temperature and the corresponding vapor pressure when the vaporizable liquid is water.

DETAILED DESCRIPTION

Figure 1:
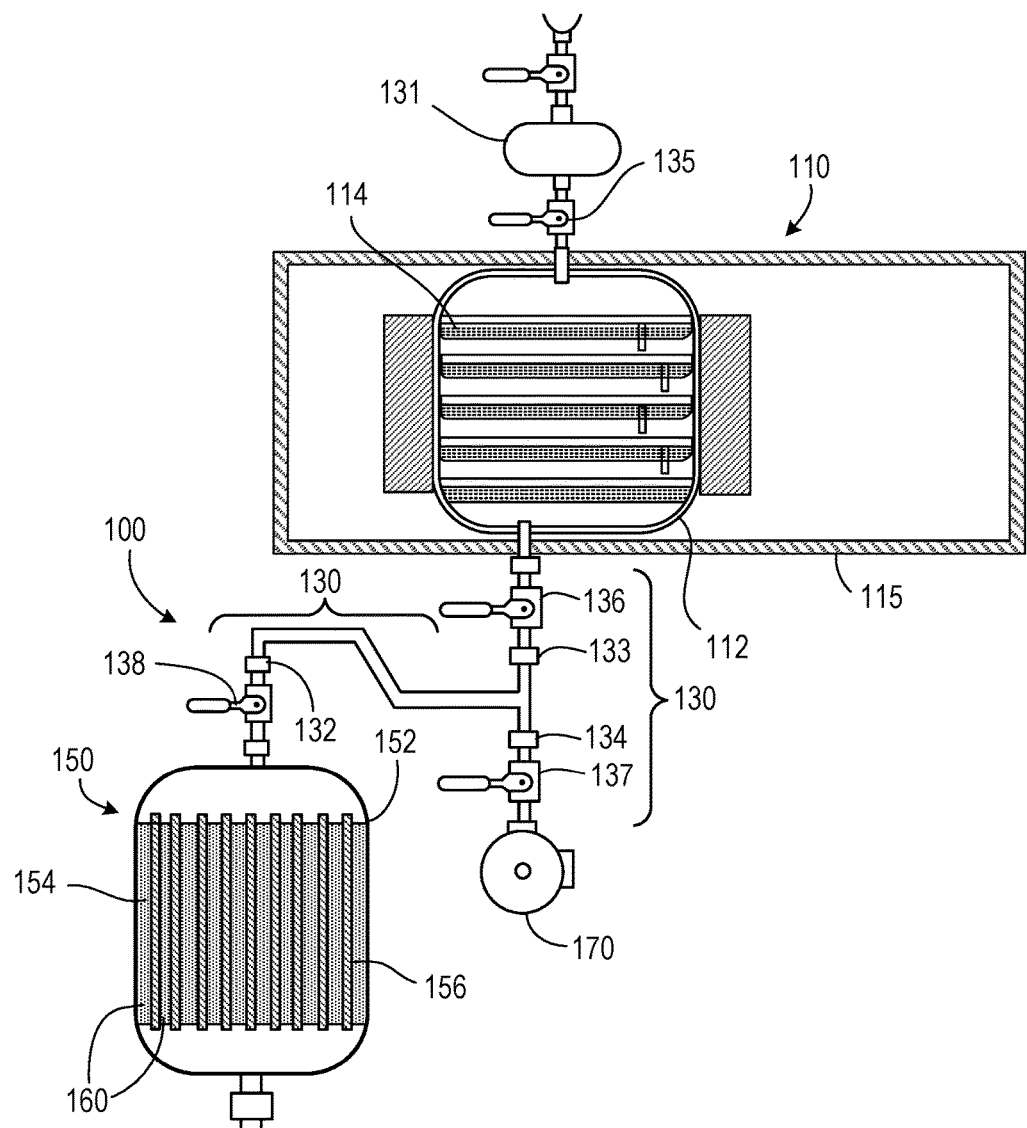
FIG. 1 is a schematic representation of an embodiment of a cooling system including an adsorbent unit, a cooling unit, and a vacuum pump.

Referring to FIG. 1, the cooling system 100 includes a cooling unit 110 that includes a cooling unit housing 112. Cooling unit housing 112 contains a vaporizable liquid 114, such as water. Cooling unit housing 112 is connected by tubing 130 to an adsorbent unit 150. Adsorbent unit 150 contains an adsorbent unit housing 152 and an adsorbent 154 (e.g., silica gel) within adsorbent unit housing 152. A vacuum pump 170 is connected to cooling unit 110 and adsorbent unit 150 through tubing 130.

As shown in FIG. 1, tubing 130 includes matable fittings (e.g., connectors) 132, 133 and 134, such that cooling unit 110, adsorbent unit 150, and vacuum pump 170 can be easily isolated and/or disconnected from each other. Tubing 130 includes valves 136, 137 and 138, which allow selective (or controlled) communication between tubing 130 and each of the cooling unit 110, the adsorbent unit 150, and the vacuum pump 170. As shown in FIG. 1, tubing 130 includes all tubes, valves, and matable connectors in a cooling system. In some embodiments, cooling unit 110 and adsorbent unit 150 also each includes valves (not shown), which control portions of the cooling system that are placed under vacuum. For example, when valve 137 and cooling unit valve 136 are open, with the vacuum pump in operation, cooling unit 110 and tubing 130 can be evacuated. When valve 138 along with valve 136 and 137 are open, with the vacuum pump in operation, the adsorbent unit 150, the cooling unit 110, and tubing 130 can be evacuated.

Tubing 130 can be insulated. For example, tubing 130 can include a foam coating or fiberglass cloth cladding. Tubing 130 can be made of steel, stainless steel, or materials with low outgassing rates such as polyimide (e.g., Dupont™ Vespel® polyimide) or polycarbonate.

As discussed above, cooling unit 110 includes housing 112. Housing 112 includes a non-corrosive thermally conductive material that can efficiently cool surrounding areas by conducting the heat from the surroundings areas to vaporizable liquid 114 inside the housing. Housing 112 can remain inert to vaporizable fluid 114 while also being sufficiently strong to withstand vacuum conditions. For example, housing 112 can be formed of copper (e.g., oxygen-free copper), steel, stainless steel, aluminum, non-corrosive thermally conductive anodized metals, and/or alloys thereof. Housing 112 includes one or more reservoirs (stacked trays 202) to hold vaporizable fluid 114 and is in good thermal contact with the housing 112. In some embodiments, housing 112 includes heat fin(s), heat exchanger(s), heat pin(s), heat pipe(s), or any combination thereof that can efficiently conduct heat from the surroundings and housing 112 to the vaporizing fluid 114. Housing unit 112 can also have heat fins on the outside to exchange thermal energy with the surroundings. In some embodiments, a fan is installed on housing unit 112 to increase airflow over the fins to increase heat exchange.

Vaporizable fluid 114 has a high latent heat of vaporization such that a relatively large amount of heat can be removed from cooling unit 110 upon evaporation of a given volume of vaporizable fluid 114. Examples of suitable vaporizable fluid 114 include water, which has a latent heat of evaporation value of 2.23 kJ/g.

As shown in FIG. 1, cooling unit 110 is disposed within an insulated container 115. The insulated container is variable in size. For example, where the cooling system is a refrigeration system, the insulated container is sized to contain foods and/or medicaments. Where the cooling system is a room air-conditioner, the insulated container 115 can be the insulated room itself. For a cold storage plant, the insulated container 115 can be the volume to be cooled.

Adsorbent unit 150, as noted above, includes an adsorbent unit housing 152. Housing 152 includes a non-corrosive thermally conductive material that can conduct heat to and from adsorbent unit 150 while also being sufficiently strong to withstand vacuum conditions. For example, housing 152 can be formed of oxygen-free copper, steel, stainless steel, aluminum, non-corrosive thermally conductive anodized metals, and/or alloys thereof. In some embodiments, housing 152 is dark colored (e.g., dark grey, dark blue, dark brown, or black) such that it can maximize absorption of solar energy (e.g., in the form of visible and infrared radiation) during desorption and also radiate heat during the cooling cycle. For example, housing 152 can be formed of a black anodized metal. In some embodiments, housing 152 includes heat fin(s), heat exchanger(s), heat pin(s), heat pipe(s), or any combination thereof that can efficiently conduct heat to and away from adsorbent material 154 from/to outside surroundings. In some embodiments, housing 152 is covered with a water-soaked blanket to help remove the heat generated by adsorption during the cooling cycle.

Still referring to FIG. 1, adsorbent unit 150 contains the adsorbent 154 and includes spacers 156 that separate portions of adsorbent 154 from each other. Adsorbent 154 can include a solid hygroscopic material, such as silica gel, molecular sieves, natural and synthetic zeolites, an activated carbon, an alumina, a clay (e.g., montmorillonite), calcium sulfate, synthetic polymers, titanium silicate, lithium chloride, or combinations thereof. In some embodiments, a mixture of adsorbents is used in any given adsorbent unit. In certain embodiments, adsorbent 154 is silica gel having a diameter of 2-4 mm. Adsorbent 154 can be easily dried (e.g., regenerated), for example, in the case of a silica gel adsorbent, by heating adsorbent unit 150 to a temperature of 125° C. or more for a period of 2 hours or more, depending on factors such as adsorbent size, layer thickness, packing density, and manufacturer's recommendation.

Spacers 156 separate portions 160 of adsorbent 154 from one another. Spacers 156 are permeable to vapors of the vaporizable liquid. For example, spacers 156 can be in the form of a mesh metal tube, perforated metal tube, or any other shape. Spacers 156 can be made of a material that has a low outgassing rate, such as metal, steel, stainless steel, or materials with low outgassing rates such as polyimide (e.g., Dupont™ Vespel® polyimide) or polycarbonate. Spacers 156 can increase the surface area of adsorbent 154 exposed to vapors and can increase the rate at which a vapor is adsorbed by the adsorbent. In some embodiments, adsorbent 154 is contained in perforated or mesh-walled containers/capsules, thus facilitating replacement of adsorbent 154. The containers/capsules can be strategically placed within housing 152 to generate annular space such that space is available for vapors to come in contact with the adsorbent. The adsorbent material 154 can be in thermal contact with the housing 152, and thereby, the surroundings.

As discussed above, vacuum pump 170 is connected to cooling unit 110 and the adsorbent unit 150 through tubing 130. Tubing 130 can be easily disconnected from the cooling unit and the adsorbent unit by the use of matable fittings 134. Valves 136, 137 and/or 138 allow vacuum pump 170 to be connected to or disconnected from the cooling unit and/or the adsorbent unit.

Figure 2:
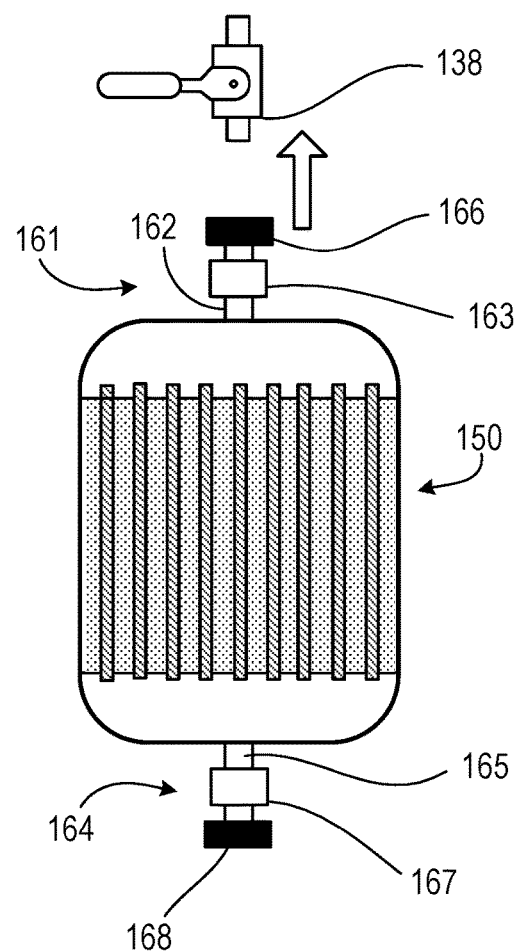
FIG. 2 is a schematic representation of an embodiment of the adsorbent unit in the cooling system of FIG. 1.

Referring to FIG. 2, the adsorbent unit 150 is in the form of a cartridge that allows for easy removal and replacement. Adsorbent unit 150 has, at end 161, tubing 162 connected to a matable fitting/coupling 163 that can connect to shut-off valve 138. A similar arrangement is at the opposite end 164, where tubing 165 is connected to matable fitting 167. During regeneration of the adsorbent unit (e.g., drying, desorption of the adsorbent material), adsorption unit 150 is decoupled from shut-off valve 138 and end cap 168 is removed to facilitate air movement due to convection currents and adsorption unit 150 is then subjected to heat input. When subjected to heat input (e.g., using solar energy), the adsorbed vapors are released from the adsorbent and exhausted to the atmosphere. To facilitate air circulation, the adsorption units and connecting tubing can be at an incline with respect to horizontal. After desorption is complete, adsorbent unit 150 can be sealed with an end caps 166 and 168 to keep the adsorbent dry until it is needed for the adsorption cycle. At that time, one of the end caps 166 or 168 is removed, the adsorbent unit is connected to shut-off valve 138 via matable fitting 163 or 167, respectively, and the unit is ready for the cooling cycle.

Figure 3:
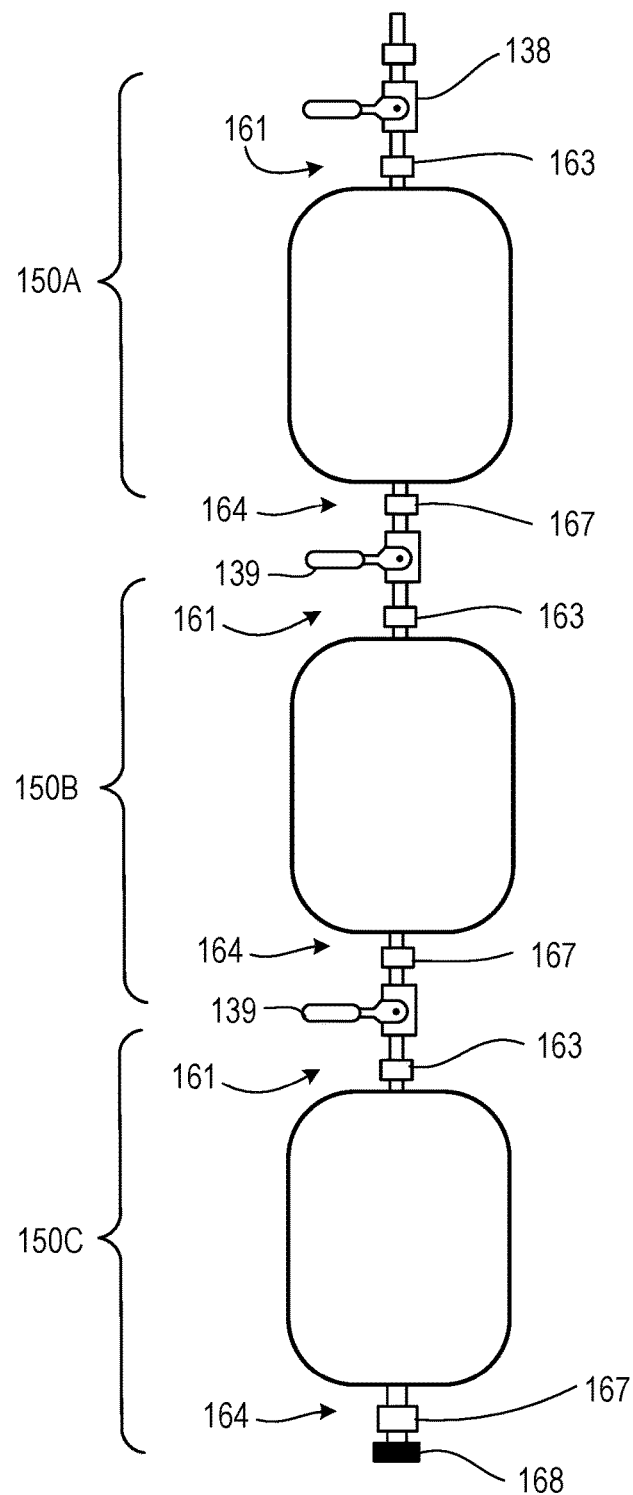
FIG. 3 is a schematic representation of an embodiment of a cooling system including multiple adsorbent units of FIG. 2, placed in series.
Figure 4:
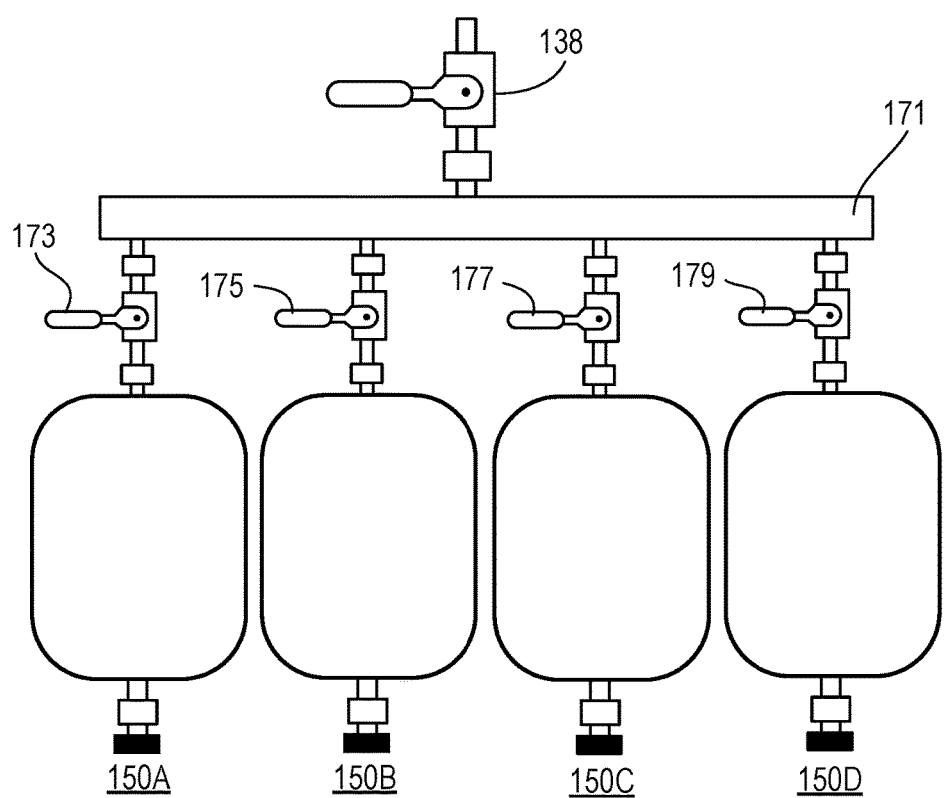
FIG. 4 is a schematic representation of an embodiment of a cooling system including multiple adsorbent units of FIG. 2, placed in parallel.

In some embodiments, referring to FIGS. 3 and 4, multiple adsorbent units 150 are connected in series or in parallel, respectively, to a cooling unit. The use of multiple adsorbent units can increase the capacity and/or the rate at which a vaporized fluid is adsorbed from the cooling unit, thereby increasing the cooling capacity and/or the cooling rate.

Referring to FIG. 3, when placed in series, a first adsorbent unit 150A is connected to a second adsorbent unit 150B by matable fitting/coupling 167 (which can include an inline shut-off valve 139) as shown on end 164 from a first adsorbent unit to end 161 on a second adsorbent unit. End cap 166 (not shown) on the second adsorbent unit 150B and end cap 168 on the first adsorbent unit 150A are removed prior to coupling the two adsorbent units. As shown in FIG. 3, the last (third) unit 150C in series has an end cap 168.

Referring to FIG. 4, when placed in parallel, multiple adsorbent units (as shown, units 150A, 150B, 150C, and 150D) are joined via header tubing 171 to a cooling unit (not shown). Optional in-line shut-off valves 173, 175, 177, and 179 can provide individual control of each of the adsorbent units such that each can participate in or be isolated from the cooling system (e.g., by connecting or disconnecting each adsorbent unit to/from the cooling unit).

The adsorbent unit is easily replaceable and reusable. For example, once the adsorbent unit is saturated with vapor, the saturated adsorbent unit is either physically removed or logically isolated from the cooling system and replaced by a dry adsorbent unit. The removed saturated adsorbent unit is then heated to remove the adsorbed vapor, thus reclaiming an adsorbent unit that can be reused in the cooling system. Drying the adsorbent unit can include heating the adsorbent unit using solar energy, waste heat energy, electrical energy, and/or biogas heat energy. The energy input can be from a renewable source. In some embodiments, the adsorbent material itself can be removed from the adsorbent unit housing and dried by heating the material using solar energy, waste heat energy, electrical energy, and/or biogas heat energy. Once the adsorbent material is dry, the material can be reintroduced into an adsorbent unit housing.

In some embodiments, referring back to FIG. 2, instead of removing the adsorbent unit, the shutoff valve 138 (or other valve depending on configuration) is shut off to isolate the adsorbent unit from the cooling system, end cap 168 is opened, and the adsorbent unit is dried while still physically connected to, but not in vacuum communication with, the cooling system. Once the adsorbent unit is dry, end cap 168 is replaced, and valve 138 can be opened to place the adsorbent unit in communication with the cooling unit, and the vacuum can be applied anew for the next cooling cycle.

Figure 5:
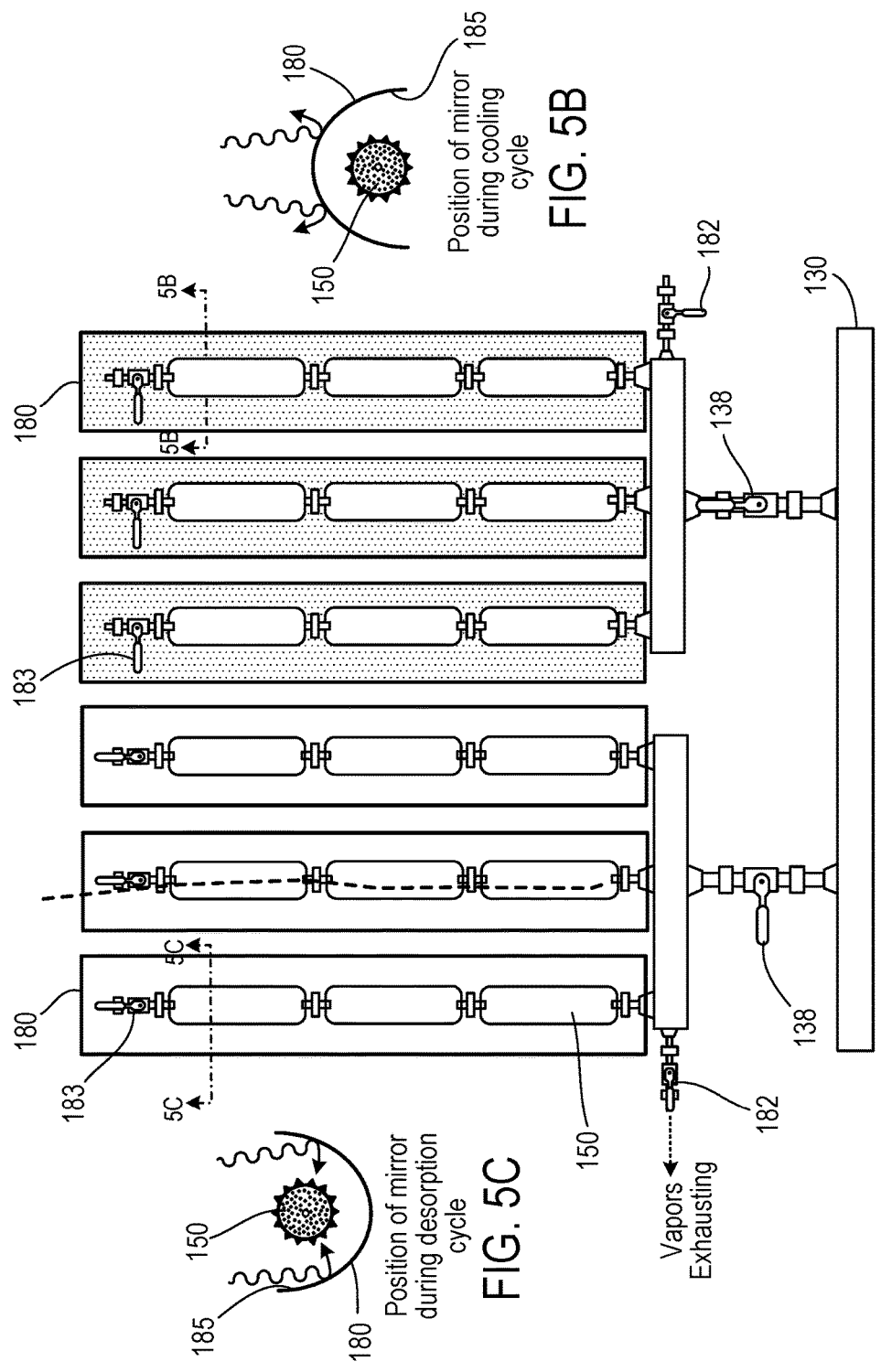
FIG. 5A is a schematic representation of an embodiment of an adsorbent unit and a parabolic solar collector that can be used in the cooling system of FIG. 1.
FIG. 5B is an enlarged schematic cross-sectional representation of an adsorbent unit and a parabolic solar collector of FIG. 5A, during a cooling cycle.
FIG. 5C is an enlarged schematic cross-sectional representation of an adsorbent unit and a parabolic solar collector of FIG. 5A, during a desorption cycle.

In some embodiments, referring to FIG. 5A, adsorbent units 150 include an externally connected rotatable parabolic mirror 180. When adsorbent units 150 are in operation (FIG. 5A, right and FIG. 5B), parabolic mirror 180 is rotated such that it casts a shadow on the adsorbent units. Shut-off valves 138, 182, and 183 are in positions such that the adsorbent units are connected to the cooling unit and are under vacuum. When adsorbent units 150 are being regenerated (FIG. 5A, left and FIG. 5C), they are isolated from the cooling system by shutting valve 138. Shut-off valves 182 and 183 are opened to allow natural air circulation due to convection and desorbed vapor (e.g., water vapor) exhaustion from the heated adsorption material (e.g. silica gel). As shown in FIG. 5C, during desorption, parabolic mirror 180 is rotated so that reflective surface 185 is oriented towards adsorbent units 150 to direct incident solar energy onto the adsorbent unit to heat the adsorbent unit housing, which can in turn transfer heat to the adsorbent material to regenerate (e.g., dry, desorb) the adsorbent material. This arrangement can, for example, be suited for rooftop or balcony installations.

Figure 6:
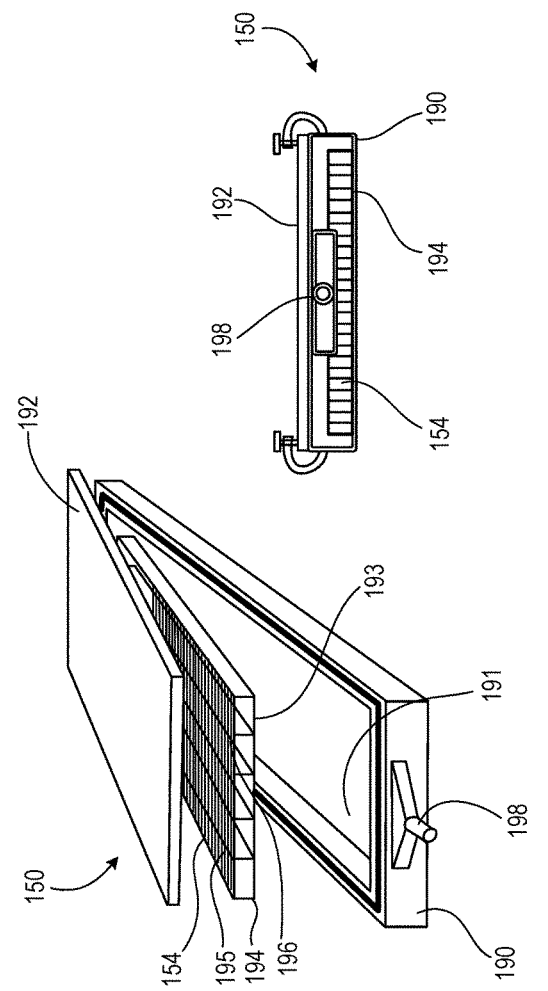
FIG. 6 is a schematic representation of an embodiment of a flat-plate solar collector that can be used in the cooling system of FIG. 1.

In some embodiments, referring to FIG. 6, adsorbent unit 150 is in the form of a flat plate collector with an open metal container 190 that is designed to withstand vacuum and a transparent plate 192 made of glass or similar material sealing the open container. The adsorbent material 154 is contained in a wide flat (about 1" thick) perforated sheet box 194 that on side 193 is in thermal contact with the inside surface 191 of the aluminum (or steel) tray-like container 190 and on the top and side surface 195 is exposed to vapors from the vaporizable liquid. The perforated sheet box 194 contains internal heat spreaders 196 that facilitate the conduction of heat to/from the adsorbent material from/to the bottom of the aluminum (or steel) tray. The aluminum (or steel) container 190, on the open side, is sealed with toughened plate glass 192 or similar transparent material. The transparent material allows sunlight to enter but traps in heat, which assists in regenerating saturated adsorbent material for reuse in cooling cycle. The metal container 190 has tubing 198 and/or matable connector (not shown) at opposite ends similar to tubing 165 and matable connector 167, as described earlier. These flat plate adsorbent units can be used in series and/or parallel configurations to increase rate of adsorption and/or capacity. The space between glass plate 192 and perforated sheet box 194 can provide room for the vapors to spread over the entirety of the adsorbent material for efficient adsorption. The flat plate adsorbent unit can be easily re-charged in a regeneration (e.g., drying, desorption) cycle by exposure to solar energy. Adsorbent layer thickness can be chosen to optimize utilization of adsorbent for a given adsorption capacity.

Figure 7:
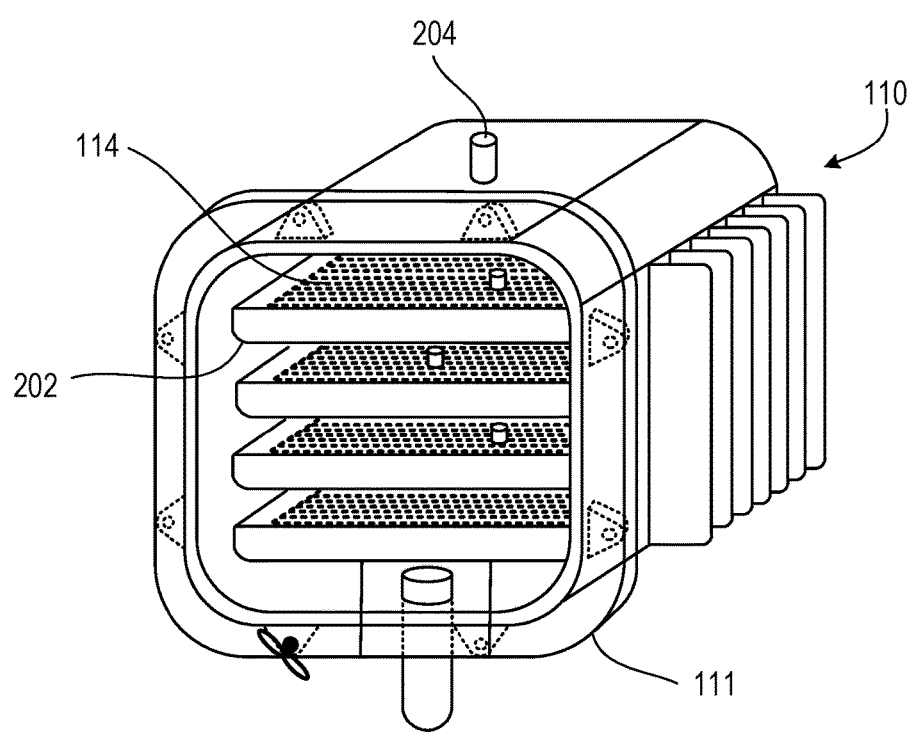
FIG. 7 is a schematic representation of an embodiment of the cooling unit used in the cooling system of FIG. 1.

In some embodiments, referring to FIG. 7, cooling unit 110 is designed to have increased surface area from which vaporizable fluid 114 can evaporate. Cooling unit 110 contains stacked or cascading trays 202, each of which contains a vaporizable fluid. In some embodiments, the trays are arranged such that when the vaporizable fluid is delivered to the cooling unit (e.g., by pouring to inlet 204), the vaporizable fluid trickles or cascades from a more elevated tray to a lower tray. The vaporizable fluid evaporates from each of the trays. In some embodiments, instead or in addition to multiple trays, the cooling unit includes grooved wicks, sintered wicks, or mesh wicks to increase the surface area from which vaporizable fluid 114 can evaporate. In some embodiments, cooling unit 110 is designed to be user-serviceable by opening front plate 111, e.g., for the purposes of cleaning or for removing vaporizable fluid 114.

In some embodiments, vaporizable fluid tray 202 and/or cooling unit housing 112 includes surface irregularities and or nucleation sites to encourage evaporation of the vaporizable fluid. For example, tray 202 and/or cooling unit housing 112 can include bumps, protrusions, dents, pits, grains, and/or nanoscale surface modifications on a surface that is in contact with the vaporizable fluid. In some embodiments, nucleation materials are added to the container 202. For example, the added nucleation materials can include porous and chemically inert materials such as boiling chips.

Referring back to FIG. 1, vacuum pump 170 can be manually operated, for example, using a hand-crank. In some embodiments, vacuum pump 170 is operated using electrical energy, wind energy, and/or solar energy. For example, vacuum pump 170 can be powered by a battery system charged by a solar panel. The vacuum pump can be intermittently operated during reapplication of a vacuum when replacing adsorbent unit 150 and/or when adding vaporizable fluid 114. The applied vacuum can be sustained until the adsorbent is saturated.

In some embodiments, at the start of operation, vacuum (e.g., a negative pressure) is applied to cooling unit 110 and adsorbent unit 150, which are placed in communication with one another. At this time, there can be no vaporizable fluid in the cooling unit. The negative pressure can depend on the application and the desired temperature, and can be different for different systems. For example, for air conditioning, the pressure can be in the range from 0.03 atm to 0.006 atm. Once the desired pressure has been reached, the pump is isolated and shut down.

Referring to FIGS. 1 and 7, vaporizable fluid 114 is then introduced through opening 204 by opening valve 135 to allow vaporizable fluid 114 previously filled in reservoir 131 to drain by gravity into the cascading trays 202. Vaporizable fluid 114 evaporates as a vapor from cooling unit 110 by boiling at a low temperature and the generated vapor is adsorbed by the adsorbent material in adsorbent unit 150. Rapid cooling of the insulated container or space can be achieved as heat energy is removed in the form of latent heat. Cooling can continue as heat is drawn from the surroundings and supplied to the vaporizable fluid. The cooling unit and adsorbent unit are sized appropriately based on the vaporizable fluid, the adsorbent material, and the BTU rating of the system. For example, in a water-silica gel system, the amount of silica gel needed would be approximately 3.3 times the amount of water by mass. Cooling can continue until all vaporizable fluid 114 is evaporated or until the adsorbent material is saturated, which can occur approximately simultaneously. In some embodiments, when all the vaporizable fluid is evaporated and/or all the adsorbent material is saturated, the cooling system can be recharged (e.g., by adding more vaporizable fluid and replacing the saturated adsorbent material with a dry adsorbent material) and vacuum can be applied anew, repeating the cycle. In some embodiments, the cooling unit or the adsorbent unit is recharged prior to complete evaporation of vaporizable fluid or saturation of the adsorbent material.

While a cooling system that does not contain a vaporizable fluid prior to application of negative pressure is described above, in some embodiments, the cooling unit contains a vaporizable liquid before negative pressure is generated in the cooling system. Cooling of the cooling unit can be modulated (i.e., controlled) by controlling the amount of vaporized vaporizable fluid (e.g., relative to the amount of adsorbent material exposed to the vaporized fluid), the amount of adsorbent material (e.g., relative to the amount of vaporized vaporizable fluid present in the cooling system), or both the amount of vaporized vaporizable fluid and the amount of adsorbent material in the cooling system. Controlling the amount of vaporized vaporizable fluid and/or adsorbent material available to participate in cooling of the cooling unit can occur by closing or opening valves (e.g., valves 136 and/or 138) between the cooling unit(s) and the adsorbent unit(s) in a cooling system. For example, when valve 136 and/or 138 is/are shut off, the pressure inside the cooling unit can increase, causing the boiling point of the vaporizable liquid to increase and cooling of the cooling unit to temporarily cease. By variably controlling valves 136 and/or 138, the rate of cooling can be controlled, and hence, the temperature can be controlled. In some embodiments, a cooling system can be cooled to a selected temperature by controlling the negative pressure in the cooling system.

EXAMPLES

Example 1

Prototype Cooling Device

Proof of principle prototype cooling systems that can effectively cool without requiring a continuous supply of energy were engineered, constructed, and evaluated.

Figure 8A:
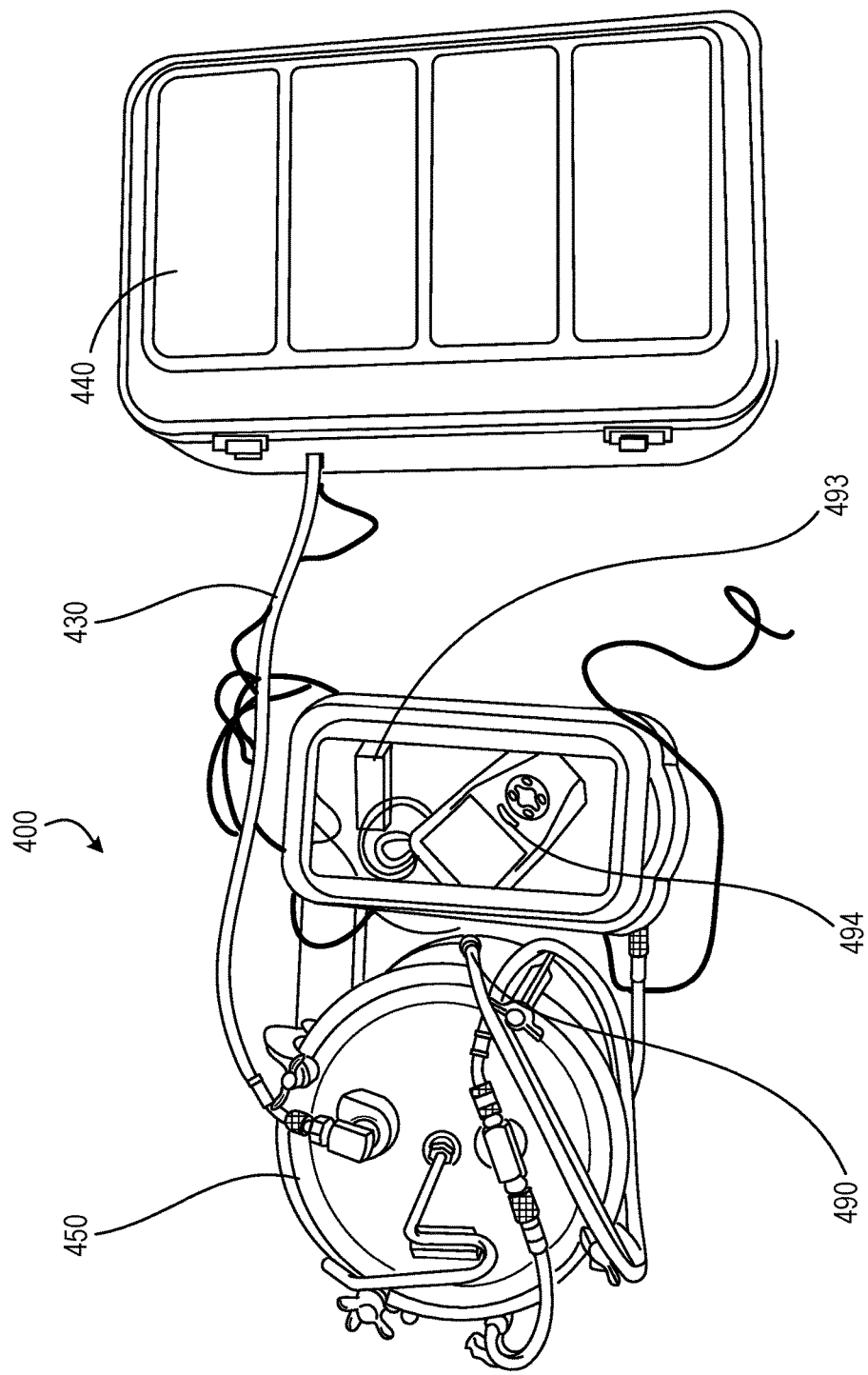
FIG. 8A is a photograph of an embodiment of a cooling system.
Figure 8B:
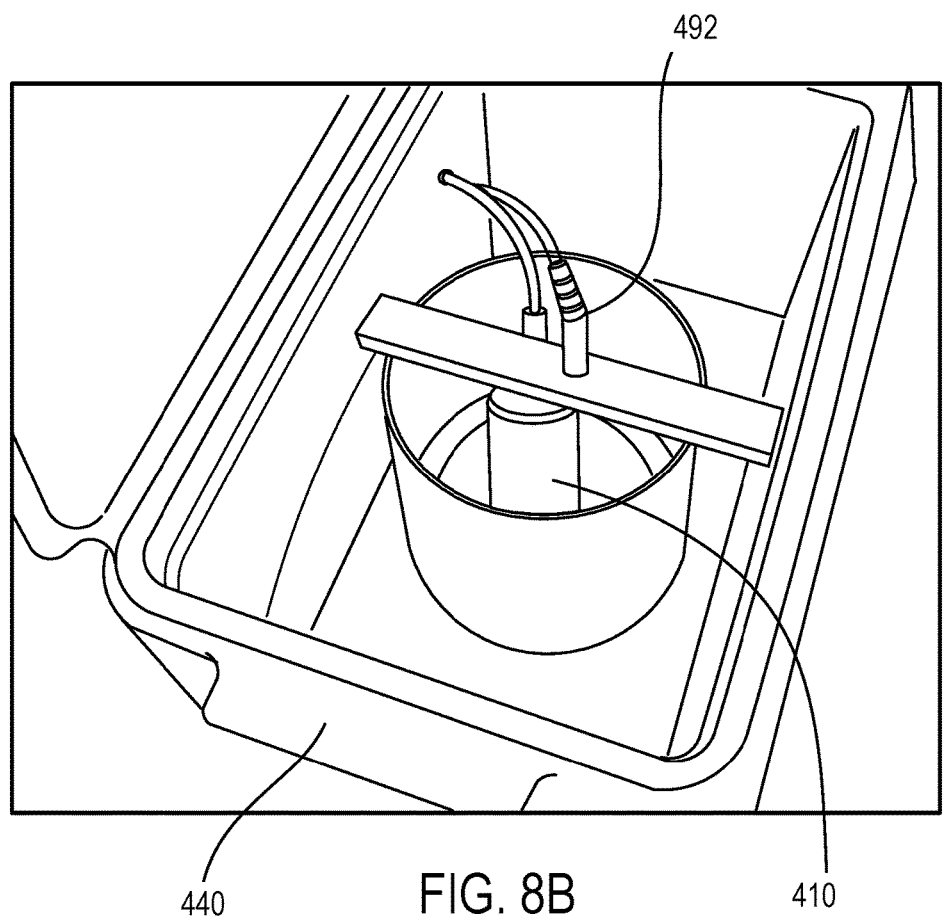
FIG. 8B is a photograph of a cooling unit of the cooling system of FIG. 8A.
Figure 8C:
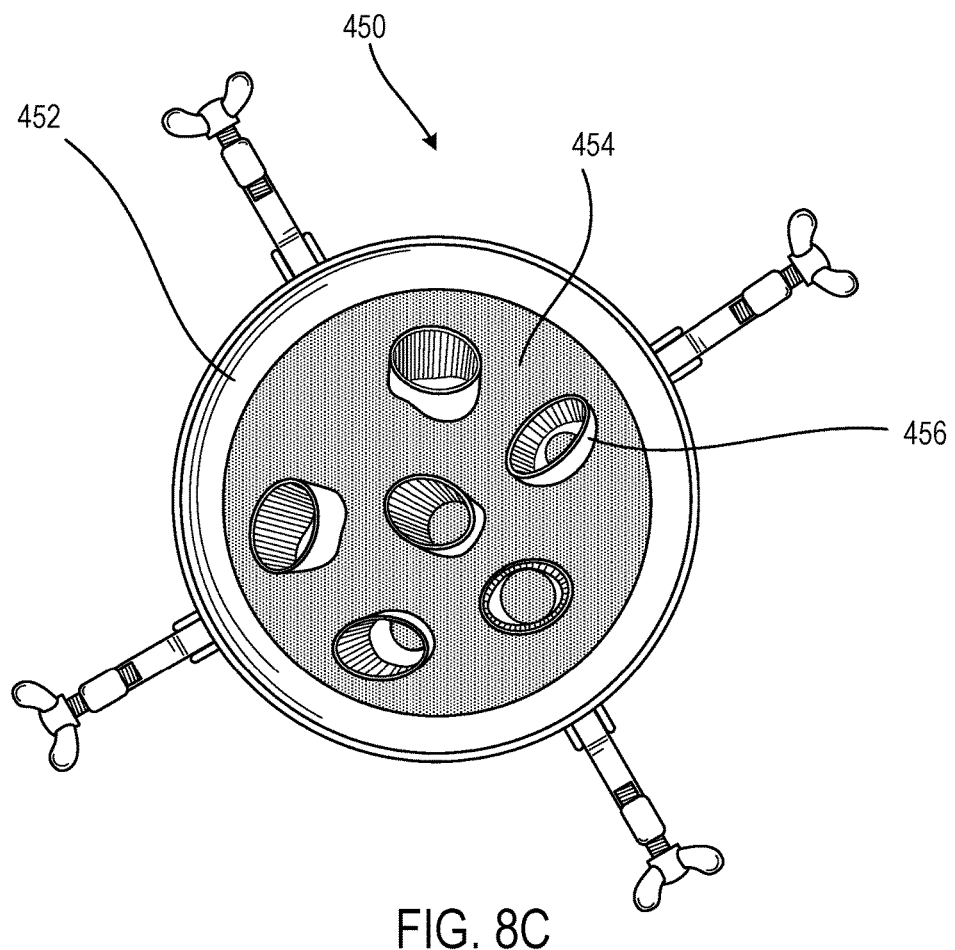
FIG. 8C is a photograph of an open adsorbent unit of the cooling system of FIG. 8A.
Figure 9:
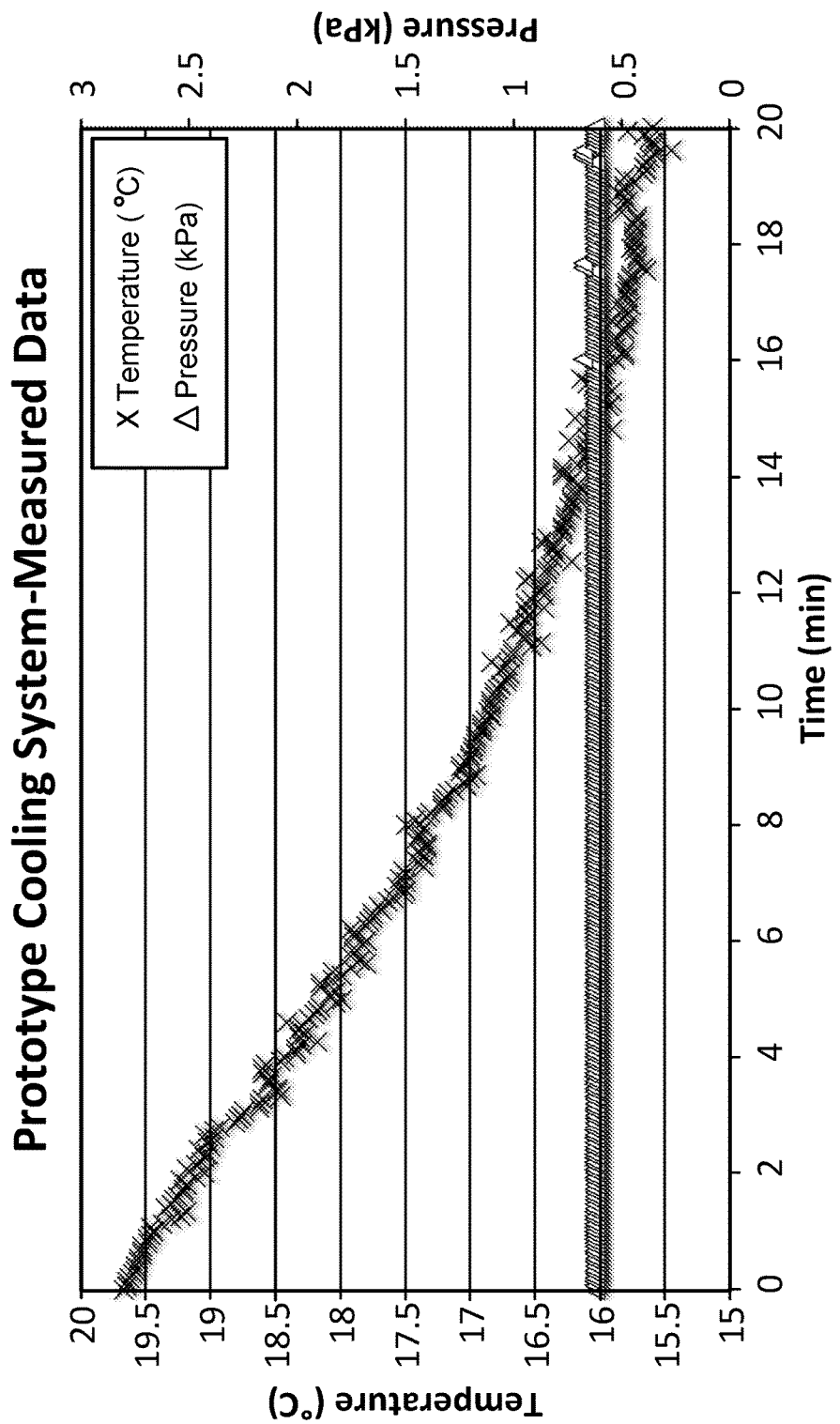
FIG. 9 is a graph showing a cooling performance of an embodiment of a cooling system.

A representative prototype cooling system 400 is shown in FIGS. 8A, 8B, and 8C. Referring to FIGS. 8A and 8B, prototype cooling system 400 included a cooling unit 410 disposed within an insulated container 440, an adsorbent unit 450 connected to cooling unit 410 via tubing 430, and a vacuum pump (not shown) connected to adsorbent unit 450 and cooling unit 410 via tubing 490 (in FIG. 8A, shown disconnected from the pump). In the experimental setup, a temperature probe 492 measured change in temperature of the contents inside the insulated container 440 during operation of the cooling system. A pressure sensor 493 measured pressure in the cooling system. Both the temperature and the pressure were recorded using data acquisition device 494. Data recorded from one of the experiments were presented in FIG. 9.

Referring to FIG. 8C, adsorbent unit 450 of cooling system 400 was formed of a housing 452, which contained an adsorbent 454 (silica gel) and mesh tubes 456. Mesh tubes 456 were hollow structures and were inserted into the silica gel to provide increased surface area for adsorption of a vapor from a vaporizable fluid (water) contained within cooling unit 410.

FIG. 10 shows the relationship between temperature and vapor pressure for water, the vaporizable liquid used in the experimental setup.

Other Embodiments

While the above prototype cooling system was demonstrated for use in refrigeration of foods and/or medicine, the cooling system can be used for other cooling applications, such as air conditioning, cold storage, and industrial cooling. For example, the cooling unit can be coupled to a fan that can circulate cool air through a room. The fan can be powered using solar energy, electrical energy, and/or wind energy. In some embodiments, the cooling unit does not include a fan, but can cool a room through convection. The cooling unit is not limited in size. For example, in some embodiments, the cooling unit is coupled to a ventilation system and is used to cool a building.

A number of embodiments of the invention have been described. Nevertheless, it will be understood that various modifications may be made without departing from the spirit and scope of the invention. Other embodiments are within the scope of the following claims.

What is claimed is:

1. A cooling system, comprising:
   a cooling unit comprising:
      a thermally conductive housing adapted to contain a vaporizable liquid therein and enable transfer of thermal energy from an exterior of the thermally conductive housing to the vaporizable liquid, the transfer converting the vaporizable liquid into a vapor,
      a fluid inlet adapted to receive a feed of vaporizable liquid for introducing the vaporizable liquid into the thermally conductive housing, and
      a vapor outlet;
   a first adsorbent unit comprising:
      a housing containing a reusable solid adsorbent material therein, the housing comprising:
         a metal region defining a second side of the housing, and
         a transparent region facing the reusable solid adsorbent material the transparent region of the housing defining a transparent first side of the housing positioned opposite the second side,
      a plurality of heat spreaders disposed in the solid absorbent material and thermally coupled with the metal region, the transparent region enabling solar heating of the reusable solid adsorbent material through the transparent region to regenerate the reusable solid adsorbent material,
      a vapor inlet configured to be removeably coupled to the vapor outlet of the cooling unit, the vapor inlet enabling the reusable solid adsorbent material to adsorb the vapor from the cooling unit, and
      a regeneration port sealed by a removable end cap, the regeneration port adapted to be removeably coupled to a vapor inlet of a second adsorbent unit when the end cap is removed to permit the vapor from the cooling unit to be adsorbed by the second adsorbent unit; and
   a vacuum pump configured to be placed in removable fluid communication with at least one of the cooling unit and the first adsorbent unit, the vacuum pump adapted to generate negative pressure within the cooling unit and the first adsorbent unit.

2. The cooling system of claim 1, further comprising tubing connected to the first adsorbent unit, the cooling unit, the vacuum pump, or any combination thereof.

3. The cooling system of claim 2, wherein the tubing, the cooling unit, the vacuum pump, the first adsorbent unit, or any combination thereof, comprises matable fittings.

4. The cooling system of claim 1, wherein the adsorbent unit, the cooling unit, or both the first adsorbent unit and cooling unit comprise a heat fin, a heat exchanger, a heat pin, a heat pipe, or any combination thereof.

5. The cooling system of claim 1, wherein the first adsorbent unit comprises the housing containing the solid adsorbent material and a plurality of vapor-permeable spacers that separate portions of the solid adsorbent material from one another.

6. The cooling system of claim 1, wherein the first adsorbent unit comprises the housing containing a plurality of vapor-permeable containers containing the solid adsorbent material.

7. The cooling system of claim 1, wherein the solid adsorbent material comprises a solid hygroscopic material selected from the group consisting of silica gel, molecular sieve, zeolite, activated carbon, and montmorillonite.

8. The cooling system of claim 1, wherein the transparent region of the housing enables solar heating of the reusable solid adsorbent material through the transparent region to create a convection airflow between the regeneration port and the vapor inlet, the convection airflow regenerating the reusable solid adsorbent material.

9. The cooling system of claim 1, wherein the vaporizable liquid is water.

10. The cooling system of claim 1, wherein the housing of the cooling unit comprises cascading trays within the cooling unit housing.

11. The cooling system of claim 1, wherein the cooling unit further comprises one or a plurality of wicks.

12. The cooling system of claim 1, wherein the cooling unit further comprises one or a plurality of vaporization nucleation sites.

13. The cooling system of claim 1, wherein the first adsorbent unit comprises a perforated sheet box comprising the plurality of heat spreaders and containing the reusable solid adsorbent material, the perforated sheet box positioned between the first and second sides.

14. The cooling system of claim 13, wherein the perforated sheet box is configured to expose at least a portion of the reusable solid adsorbent material to the transparent first side.

15. The cooling system of claim 13, wherein the perforated sheet box and the first side define a convection airflow passage between the regeneration port and the vapor inlet.

16. The cooling system of claim 15, wherein the convention airflow passage comprises a void between a first surface of the perforated sheet box and an interior surface of the transparent first side of the housing, the first surface of the perforated sheet box comprising the exposed portions of the reusable solid adsorbent material.

17. The cooling system of claim 1, wherein the first and second sides of the housing are flat plates positioned in parallel.

\* \* \* \* \*